Feb. 18, 1964   P. D. BLYSTONE   3,121,473
SUCTION INLET SCREEN DAMPER
Filed Oct. 31, 1962

INVENTOR.
Paul D. Blystone
BY
S. C. Thorpe
ATTORNEY

United States Patent Office 3,121,473
Patented Feb. 18, 1964

3,121,473
SUCTION INLET SCREEN DAMPER
Paul D. Blystone, Pontiac, Mich., assignor to General Motors Corporation, Detroit, Mich., a corporation of Delaware
Filed Oct. 31, 1962, Ser. No. 234,425
5 Claims. (Cl. 184—1)

This invention relates to internal combustion engines and the like having a sump from which lubricating oil or other fluid is withdrawn by a pump having its suction inlet screen supported rigidly by the lower end of the pump inlet tube extending into the sump.

The invention has particular application to automotive vehicle engines which have the crankcase oil sump within an oil pan whose side walls depend from and are secured to the bottom of the engine cylinder and crankcase block. The bottom wall of the oil pan at its deepest portion is generally provided with a crankcase oil drain plug, and above this, within the pan, is located the oil pump suction inlet screen. As distinguished from certain such inlet screen arrangements of the so-called "floating" type, the instant invention concerns those in which the screen has its supporting housing rigidly connected by a metal inlet tube to the engine oil pump located at some higher point within the oil pan or the engine crankcase.

During engine operation, and particularly when the vehicle is being driven, vibration of the tube and housing within the oil pan has a tendency to cause fatigue and eventual rupture of the tube, generally at its connection to the pump. Also, inertia effects of the sump oil in moving about within the oil pan may frequently cause fatigue cracking of the oil pan itself, generally in the area of the drain plug opening.

Because of the need to avoid interference with passage of oil through the screen, and the circumstance that the screen preferably underlies the entire lower side of its supporting housing, a formidable problem has existed in devising a simple and inexpensive arrangement for damping relative vibration between the inlet and screen assembly and the bottom wall of the oil pan. I have discovered what I believe to be a novel and entirely satisfactory means of overcoming the problem, wherein an elongated body of resilient rubber-like material is employed as the damper. One of the several dimples or embossments in the upper wall of the housing, which normally serve only to support the mid-portion of the screen against the pump suction force, is utilized as a seat for one end of this body of resilient material. The other end thereof extends downwardly from the screen and housing and has a compressible fit against the oppositely facing surface of the oil pan. Preferably also, a transverse bracket is secured to the housing below the screen, to serve as a support against lateral displacement of the damper body.

The invention will be better understood from the following detailed description of a preferred embodiment thereof, having reference to the drawing, wherein.

Figure 1:
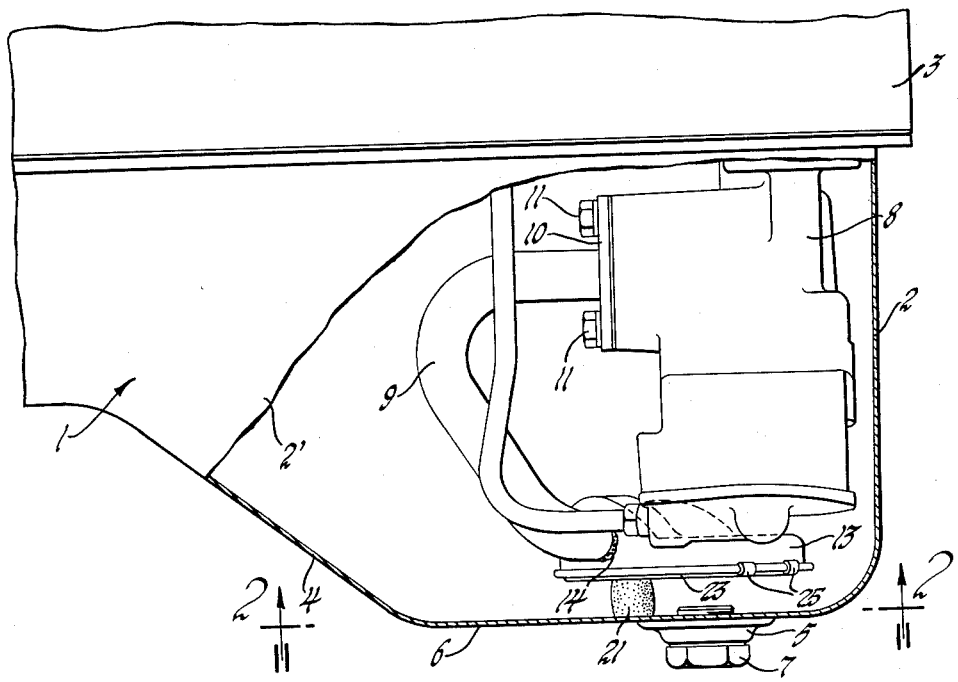
FIGURE 1 is a side elevational view of the lower crankcase portion and oil pan at the oil sump end of an internal combustion engine, a portion of the oil pan being broken away to show the arrangement of my oil sump inlet damper therein.
Figure 2:
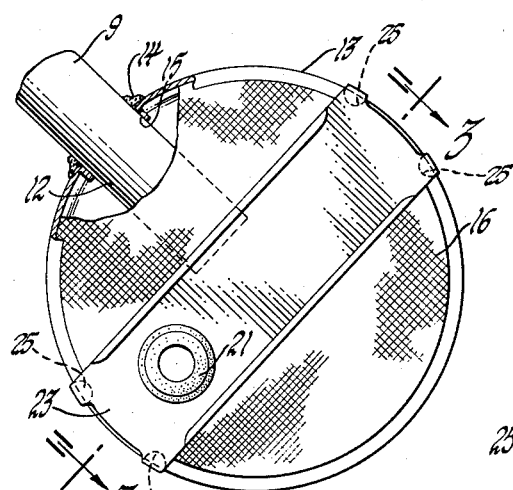
FIGURE 2 is a bottom plan view of the oil inlet screen and suction tube, as seen in the direction of the arrows 2—2 in FIGURE 1, with the damping means and its supporting bracket attached.
Figure 3:
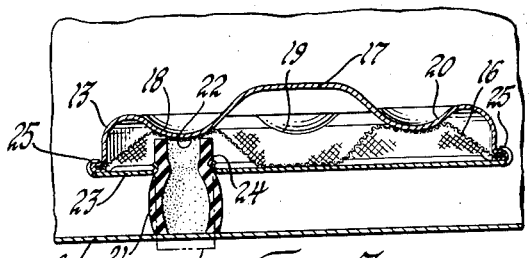
FIGURE 3 is a sectional view, taken substantially along the line 3—3 of FIGURE 2.

As will be evident from inspection of FIGURE 1, an internal combustion engine may have an oil pan 1 whose side walls 2 and 2' are secured to and depend below the crankcase 3. The bottom wall 4 of the oil pan, as is conventional, is provided with a drain hole fitting 5 in the deepest portion 6 thereof which defines the sump. A threaded plug 7 is removable from the fitting 5 for draining the engine oil when such is desired. An engine oil pump 8, fixedly mounted by any suitable means (not shown) to the crankcase 3, serves to withdraw oil from within the sump and deliver it under pressure to the engine bearings, etc. In the particular arrangement shown, this pump is located so as to extend into the oil pan 2 in the area of the sump, but the location of the pump may be otherwise than as here shown. In any case, the pump has a rigid inlet tube 9 fixedly connected thereto, as by a tube flange 10 and bolts 11. This tube extends downwardly within the oil pan and has its lower end portion 12 enclosed within a generally cup-shaped housing 13 which has its open side facing downwardly in the sump. The housing 13 is fixed, as by brazing at 14, to the tube adjacent the tube entrance aperture 15 in the side of the housing. As best shown in FIGURES 2 and 3, a screen 16 of wire mesh or the like extends across the bottom open side of the housing, and is secured thereto in conventional manner by crimping the lower extremities of the housing side walls around the peripheral edges of the screen. As further support for the screen, in preventing its collapse against the upper wall 17 of the housing under pump suction force, several dimples or embossments 18, 19 and 20 are provided in the housing upper wall 17. These embossments serve to ensure that a substantial area of the screen is spaced from the wall 17 and thus available to accommodate oil flow into the housing from the sump for delivery without undue restriction to the pump inlet tube 9.

In accordance with my invention, an elongated body of resilient rubber-like material, shown in the form of a length of tubing 21, is arranged to extend between the bottom wall portion 6 of the oil pan and the portion 22 of the screen which abuts the housing embossment 18. The length of the resilient material body 21 is such that, in its installed-position, it is compressed endwise from its normal or free length (shown in broken outline 21' in FIGURE 3). The necessary extent of such compression will, of course, vary with the stiffness of the material used, the height of the housing 13 above the bottom of the oil pan, stiffness of the pump inlet tube 9 and oil pan bottom wall portion 6, etc. However, sufficient compression of the damper body to accomplish the desired result of resiliently restraining substantial vibration of the housing relative to the oil pan may readily be ascertained by experiment with different lengths of the material used.

To insure retention of the damper means against transverse displacement, a bracket 23 may be provided which extends transversely of the housing below the screen 16. This bracket has a cutout, shown as an aperture 24 therein, which snugly embraces the damper body intermediate its ends. Also, in the particular arrangement shown, the bracket 23 is in the form of a strap extending entirely across the open side of the housing and has its opposite ends 25 crimped around the peripheral lower edge of the housing to secure their assembly.

A very simple and inexpensive damper is thereby obtained which serves to prevent fatiguing vibration of both the pump inlet tube and the oil pan wall. Obviously, various minor changes in construction and arrangement of the parts from that shown and described above may be made without departing from the spirit and scope of the invention, which I now claim.

I claim:
1. In an internal combustion engine having a crank- case, an oil pan depending therefrom and including a bottom wall spaced below the crankcase, an oil pressure pump having an inlet, an oil suction tube connected to said inlet and extending therefrom downwardly within the oil pan toward said bottom wall, a downwardly open housing fixedly connected to the extended end of said tube and suspended thereby in spaced relation to said bottom wall within the oil pan, the downwardly open side of said housing having a screen extending thereacross through which oil entering the housing for delivery via the tube to the pump must pass, said housing having an embossment in its wall facing said screen, said screen being in abutment with said housing wall at said embossment, and a body of resilient rubber-like material interposed between the screen opposite said embossment and the bottom wall of the oil pan to damp relative vibration between said oil pan bottom wall and said housing.

2. In an internal combustion engine having an oil sump, a pump for withdrawing oil from the sump, and an inlet screen for the pump disposed in the sump, an oil pan having bottom and side walls defining said sump, an oil suction tube rigidly connected at one end to the pump and terminating at its opposite end above and adjacent said screen, a downwardly open housing rigidly secured to and enclosing said opposite end of the tube, said screen covering the open bottom side of said housing, said housing having a bracket extending transversely of its open bottom side between the screen and the bottom wall of the oil pan, said bracket having a body of resilient rubber-like material extending therefrom into abutment with the oil pan bottom wall for damping relative vibration between said bottom wall and said tube and housing during engine operation.

3. The combination with an engine oil pan and an oil pump having an inlet housing and screen assembly rigidly suspended within the oil pan by a tube extending from the pump inlet, said oil pan having a bottom wall, said assembly including a downwardly presenting generally cup-shaped housing and a screen extending across the bottom open side of said housing, said housing having an upper wall, said upper wall having an embossment spacing the screen from adjacent portions of said upper wall, of a body of vibration damping material interposed in compression between said oil pan bottom wall and said screen opposite said embossment.

4. The combination of claim 3, together with a strap fixed at each end to said housing and extending across said bottom open side thereof between the screen and said oil pan bottom wall, said body of vibration damping material being in the form of a vertically extending length of resilient tubing, said strap having an aperture closely surrounding and supporting said tubing against lateral displacement.

5. In combination with an oil pump suction tube and inlet screen assembly adapted to depend rigidly from the oil pump into the crankcase oil pan of an internal combustion engine, said assembly including a generally cup-shaped housing, a screen extending across the open side of said housing, said housing having an embossment in its wall opposite the screen, said screen being in abutment with said embossment and spaced thereby from the adjacent portions of said housing wall, a bracket fixed to the housing and extending transversely of said open side thereof, said bracket having a portion thereof cut out opposite said embossment, and an elongated body of resiliently yieldable material extending generally perpendicularly to said housing wall, one end of said body being in abutment with the screen opposite said embossment and the other end extending a sufficient distance therefrom to abut the opposing internal wall surface of the oil pan when said assembly is installed in the engine, said bracket cutout closely embracing said body intermediate its said ends.

References Cited in the file of this patent
UNITED STATES PATENTS 1,768,511    Cram et al. _____ June 24, 1930
2,711,828    Webb et al. _____ June 28, 1955